United States Patent

[11] 3,616,882

| [72] | Inventor | Harvey Clinton White<br>West Lafayette, Ind. |
|---|---|---|
| [21] | Appl. No. | 8,860 |
| [22] | Filed | Feb. 5, 1970 |
| [45] | Patented | Nov. 2, 1971 |
| [73] | Assignee | TRW Inc.<br>Cleveland, Ohio |

[54] HYDRAULIC MOTOR-PUMP ASSEMBLY WITH BUILT-IN BRAKE
4 Claims, 6 Drawing Figs.

[52] U.S. Cl. .................................................. 192/3 R,
192/4 B, 188/366, 188/271, 417/319, 418/181
[51] Int. Cl. .................................................. F16d 55/12
[50] Field of Search .................................................. 188/367,
152.86 A, 271; 418/181; 192/3, 4 B

[56] References Cited
UNITED STATES PATENTS

| 2,181,988 | 12/1939 | Davis | 188/152.86 A X |
| 2,334,629 | 11/1943 | James | 188/271 |
| 2,379,972 | 7/1945 | Lambert | 188/152.86 A |
| 2,821,273 | 1/1958 | Sanford et al. | 188/152.86 A |
| 3,071,210 | 1/1963 | Wrigley et al. | 418/181 X |
| 3,155,197 | 11/1964 | Lee et al. | 188/271 |
| 3,208,565 | 9/1965 | Heckt | 192/3 |

*Primary Examiner*—Benjamin W. Wyche
*Attorney*—Hill, Sherman, Meroni, Gross & Simpson

ABSTRACT: A hydraulic motor-pump assembly having an axial chamber formed therein, a pair of axially spaced stationary radial wall members within the chamber, a pair of relatively rotationally and orbitally movable gear members disposed within the chamber between the radial wall members to form expanding and contracting fluid pockets between the teeth thereof and various fluid ports and passages for directing fluid through the housing and to and from the respective fluid pockets in synchronism with the relative movement of the gear members. A work input-output shaft is connected for joint rotation to one of the gear members. A nonrotatable flexible disc-shaped braking plate is disposed within the chamber between the rotatable one of the gear members and one of said radial wall members. A fluid pressure chamber is formed behind the braking plate in said one radial wall member. A fluid passage is formed in the housing for connecting the pressure chamber to a source of pressurized fluid to selectively urge the braking plate into tight frictional gripping relation with the rotatable gear member thereby braking or locking the gear member against rotation.

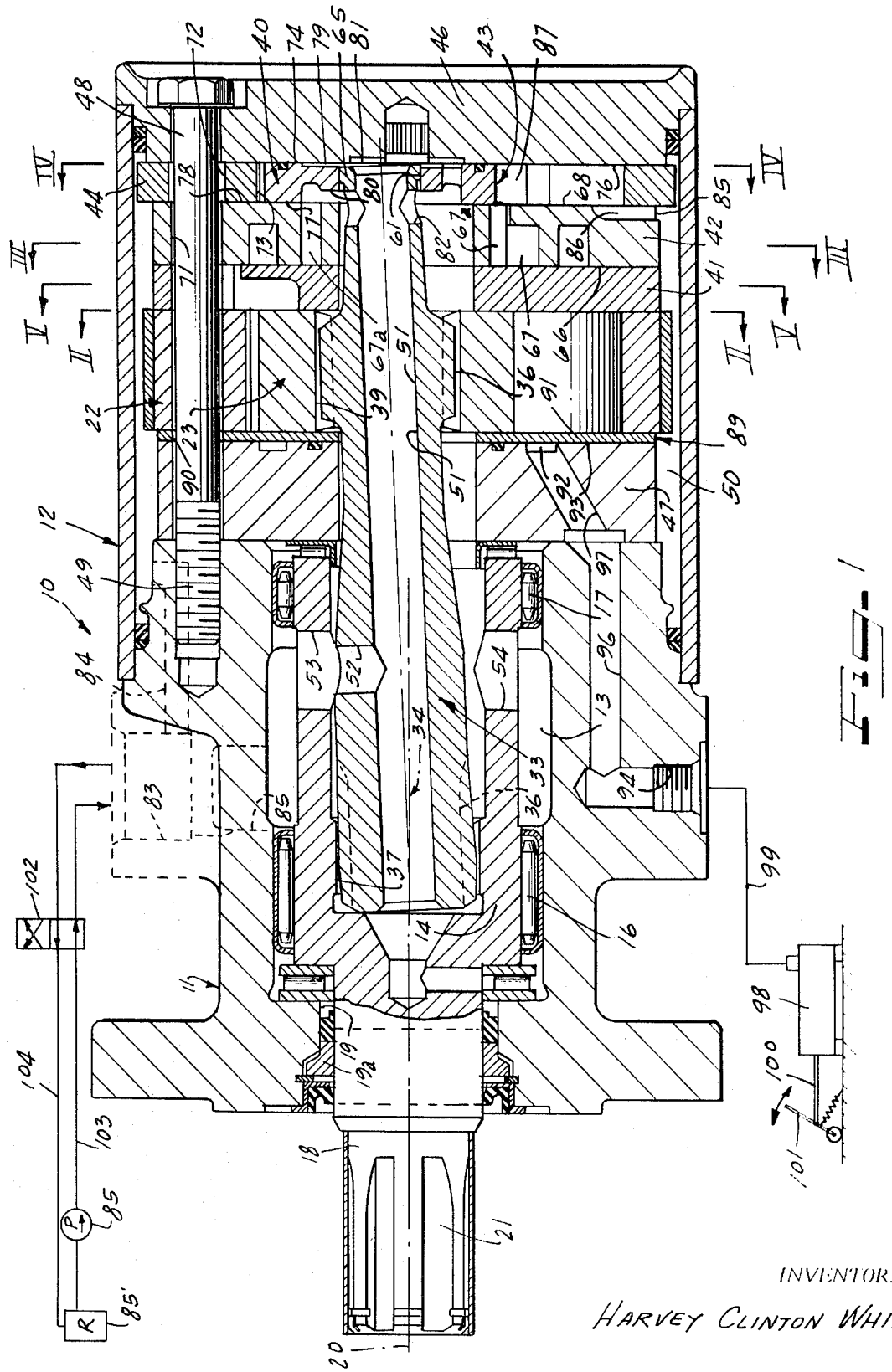

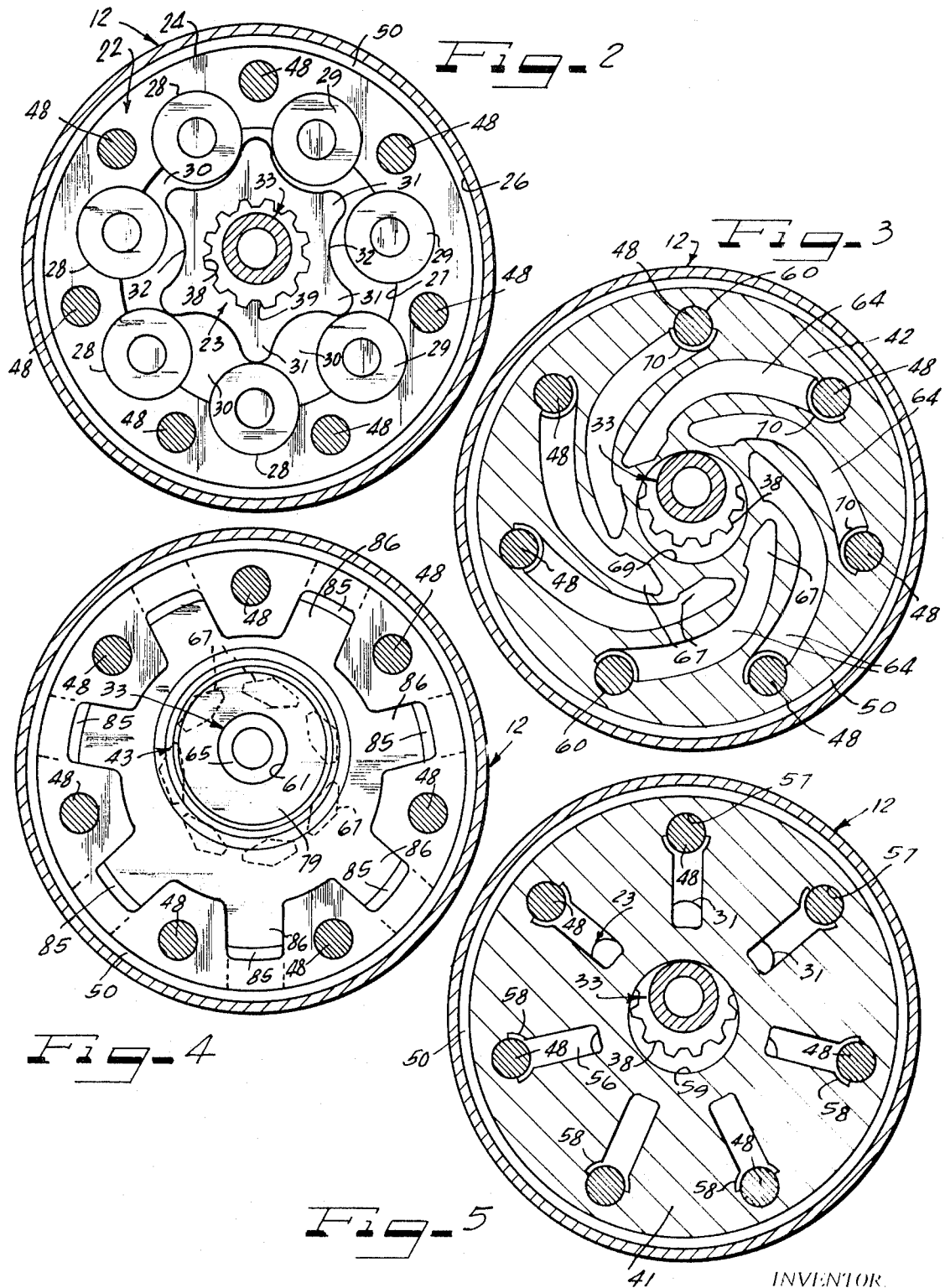

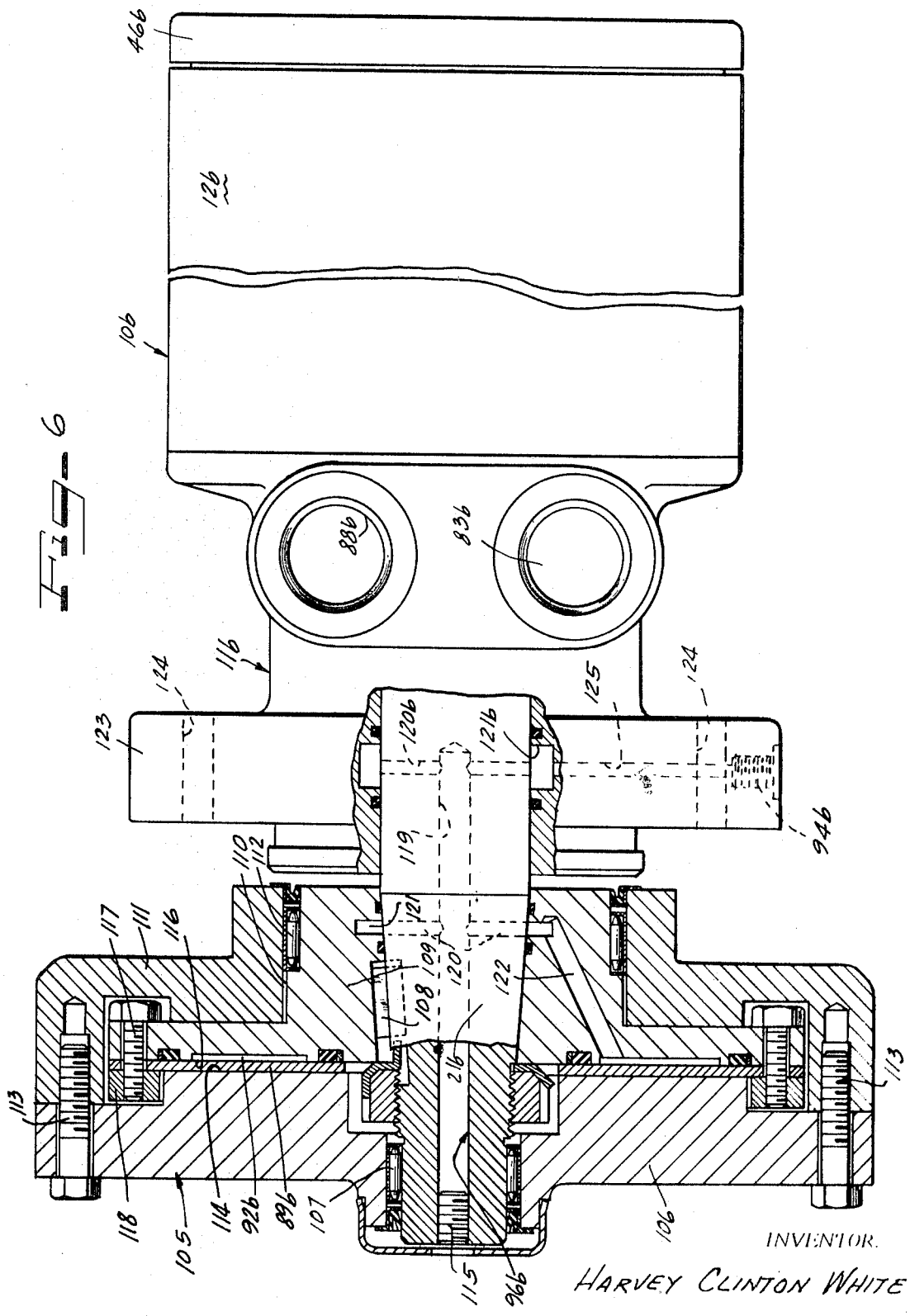

HYDRAULIC MOTOR-PUMP ASSEMBLY WITH BUILT-IN BRAKE

BACKGROUND OF THE INVENTION

This invention relates generally to the field of hydraulic pump-motor devices and more particularly to such devices characterized by the employment of gear members as the fluid displacement structure upon which the pressurized fluid acts in translating fluid pressure to work output (in the case of a motor) or which acts to pressurize the fluid (in the case of a pump).

Hydraulic gear pump-motor devices are, in general, well known in the prior art and are used in a wide variety of applications. For example, in the field of rolling stock such as farm and construction equipment such devices are presently being utilized to propel the driving wheels, to operate various auxiliary apparatus and in some cases as a component part of power steering systems.

One hydraulic pump-motor device which is being put to greater and greater use employs a pair of gear members oftentimes referred to as a gerotor gear set. That term defines a pair of gear members which includes an internally toothed gear which surrounds in meshing relation and externally toothed gear. The internally toothed gear, referred to herein as a stator, generally includes one more tooth than does the externally toothed member, referred to herein as a rotor. The arrangement of the teeth of the two members is such that upon operation thereof the two move rotationally and orbitally with respect to one another to form alternately expanding and contracting fluid pockets. In some arrangement of gerotor gear sets the stator is maintained stationarily and the rotor both rotates and orbits relative to the stator. In other arrangements the rotor is maintained stationarily as the stator orbits and rotates. In still other arrangements the rotor may rotate on a fixed axis and the stator moves in a manner complementary of the movement of the rotor.

Depending upon the particular application to which a given hydraulic pump-motor device is being put, it may be desirable to selectively brake or lock the gear members against relative movement. For example, assume such a device is being used as a motor and is connected to a main power fluid pump to operate the lifting mechanism of a forklift truck. It is often necessary or desirable to maintain the load temporarily at a given level. A shutoff valve can, of course, be mounted in the fluid piping between the main power pump and the hydraulic motor but unless a so-called "leaktight" valve is used, some leakage through the valve will occur. The amount of leakage often increases as the load increases, and leakage causes a lowering of the load.

There is a need, therefore, to provide some means of temporarily braking or locking the gear members against rotation other than an expensive "leaktight" shut-off valve.

Another application which is particularly susceptible of a braking or locking action of the gear members resides in the utilization of a hydraulic motor for operation of a winch or the like. While once again a valve may be employed in the main fluid line to hydraulically "lock" the load at a given elevation any leakage through the valve will have the effect of changing the elevation of the load.

There are other applications of hydraulic motor-pump devices particularly susceptible to the advantages inherent in braking means for the gear members. For example, in some instances it is desirable to provide a braking effect even when the main power fluid pump is inoperative or the main fluid circuitry has ruptured, causing an immediate loss of fluid pressure. In the aforementioned case of the winch, for example, a gear braking system independent of the main fluid circuitry is desirable for safety purposes to prevent an immediate dropping of the load upon rupture of the main fluid lines or other components of the circuitry.

Another application which makes the provision of a braking effect particularly desirable is in the field of garden tractors. Some garden tractors are driven by hydraulic motors attached directly to the wheels. A gear braking mechanism is desirable to vary the speed of the tractor without varying the speed of the main power fluid pump and can also be used to steer the tractor by individually braking the driving wheels.

The present invention addresses itself to the object of providing means for selectively braking or locking the gear members of a hydraulic motor-pump device other than by throttling the fluid in the main operating fluid circuitry. By means of the present invention expensive shutoff valves and throttle valves are obviated and movement of the gear members can be controlled even when the main power fluid circuitry is inoperative or has been subjected to rupture with a concomitant loss of fluid pressure.

SUMMARY OF THE INVENTION

The present invention may be summarized as comprising a hydraulic motor-pump device including a pair of relatively movable gear members, a work input-output shaft connected to the gear members and hydraulically operated friction braking means for selectively braking or locking the work input-output shaft.

The braking means includes a pressure-responsive element movable into frictional engagement with relatively rotating parts of the device. As used herein, "braking" includes not only a complete arresting or locking of the work input-output shaft (or the gear members) but also includes a selective control or reduction in the speed thereof.

The invention features a fluid pressure chamber and a flexible disc-shaped friction plate or braking element movable in response to an increase in pressure within the pressure chamber. The friction plate is interposed between spaced relatively movable parts of the device. While the pressurized fluid for actuating the friction plate may be obtained from any source including the discharge or high-pressure side of the hydraulic motor-pump assembly itself (if the device is being utilized as a pump) or the discharge side of the main power fluid pump (if the device is being utilized as a motor), in a preferred application of the device the brake-operating fluid is supplied by a separate and manually operated pump such as a hydraulic cylinder actuated by means of a foot pedal.

In view of the foregoing, another object of the invention is to provide, in a hydraulic motor-pump assembly, a hydraulically operated braking system, independent of the main hydraulic circuitry to which the gear members of the device are connected, for controlling the speed of the device or for locking the device against movement.

Another object is to provide, in a gear-type hydraulic motor, a braking system operable irrespective of the operation of the main power fluid pump which operates the motor.

Another object is to provide an independently operable braking system for serving as a safety device in the event of loss of operating fluid pressure in the main hydraulic circuitry.

Another object is to provide a simple yet effective hydraulically operated braking or clutching system between relatively rotating parts. As used herein the terms clutching and braking are used interchangeably to denote an engaging or disengaging relation between such relatively rotating parts.

Another object is to provide means for controlling the speed of a gear-type motor-pump assembly by applying an axially directed frictional force directly to the face of a rotating one of the gear members.

Yet another object is to provide, in a device of the type generally described herein, a hydraulically actuated brake which may be employed in existing designs of hydraulic motor-pump devices with little modification in design.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

BRIEF DESCRIPTION OF THE DRAWINGS

FIG. 1 is a cross-sectional view of a hydraulic motor-pump assembly constructed in accordance with the principles of the present invention, to which is connected a main power fluid pump and a foot-pedal-actuated fluid pump, both being indicated schematically;

FIGS. 2-5 are sectional views taken respectively along lines II—II, III—III, IV—IV and V—V of FIG. 1;

FIG. 6 is an elevational view of another hydraulic motor-pump assembly embodying the principles of the present invention with parts thereof shown in section.

DESCRIPTION OF THE PREFERRED EMBODIMENT

Although the principles of the present invention are of utility in any hydraulic braking system, they are of particular utility in the field of hydraulic motor-pump devices and of particular practical utility in such devices employing a pair of relatively movable gear members as the mechanism primarily acting on or being acted upon by the pressurized fluid as it is conducted through the device.

For that reason the present invention is described herein in association with a hydraulic motor-pump device, wherein the fluid displacement members comprise a geroter gear set, an illustrative embodiment of which is indicated generally in FIG. 1 at reference numeral 10. By geroter gear set is meant a pair of gears one of which is internally toothed and the other of which is externally toothed, wherein the externally toothed gear is disposed within the internally toothed gear and has one less tooth than does the internally toothed gear for relative orbital and rotational movement between the two gears during operation thereof.

The device 10 may be more particularly characterized as comprising a body 11 and a tubular casing 12 extending from the body 11. Generally axial chamber 13 is formed within the body 11 and houses a tubular drive sleeve 14 journaled for rotation on a pair of bearing members 16 and 17 spaced axially along the length of the drive sleeve 14. A work input-output shaft 18 extends through an opening 19 of the body 11, and is provided with suitable bearing and seal members as at 19a and connected in fixed assembly to the drive sleeve 14 for joint rotation therewith. The axis of rotation of the input-output shaft 18 is indicated by the dashed line at reference numeral 20. A spline connection 21 comprises means for coupling the shaft 18 to a driving member when the device 10 is being utilized as a pump and to a driven member when the device 10 functions as a hydraulic motor.

Housed within the tubular shell or casing 12 are a pair of fluid displacement members or gears 22 and 23 which cooperate to provide contracting and expanding fluid chambers or pockets and which may be more specifically referred to respectively as an internally lobed stator and an externally lobed rotor. As shown in FIGS. 1 and 2, the stator 22 comprises a cylindrical member having a peripheral wall 24 spaced radially inwardly of an inner wall 26 of the shell or casing 12. The stator 22 is centrally apertured to provide an inner wall 27 in which are formed in circumferentially spaced relation a series of axially extending recesses 28 each of which houses a cylindrical vane member 29 which together form the internal lobes of the stator 22. A series of spaces as indicated, for example, at reference numerals 30 which are situated between the lobes 29 comprise fluid pockets or chambers which, during operation of the device 10, continually alternately expand and contract as the rotor 23 rotates for the influx and efflux of fluid.

The rotor 23 is star shaped in radial cross section and comprises a plurality of lobes 31 which in number equal one less than the number of lobes 29 of the stator 22. Outer wall sections 32 which interconnect pairs of adjacent lobes 31 are shaped to generally correspond with the shape of the outer surfaces of the lobes 29.

The axis of the rotor 23 is offset with respect to the axis of the stator 22 such that movement of the rotor 23 with respect to the stator 22 is essentially hypocycloidal, that is, possessing both rotary and orbital components, as will be understood by those skilled in the art.

The rotor 23 is rotatably interconnected with the drive sleeve 14 by means of an amplifying shaft part or wobble shaft 33 which has an axis of rotation indicated at the dashed line at reference numeral 34 which is disposed at an angle to the axis of the work input-output shaft 18. The wobble shaft 33 is splined along portion 36 to a complementarily splined bore 37 of the drive sleeve 14 for joint rotation and is also splined along portion 38 to a bore 39 of the rotor 23. The splines at portions 36 and 38 on the wobble shaft 33 are curved slightly to confer limited universal pivotal movement of the shaft 33 with respect to the drive sleeve 14 and the rotor 23.

In order to direct fluid to and from the fluid pockets 30 in timed relation to the orbital and rotational movement of the rotor 23 with respect to the stator 22, the device 10 includes a commutation valving arrangement indicated generally at reference numeral 40. More specifically, the arrangement 40 comprises a pair of stationary valve plates 41 and 42 which may be referred to respectively as an intermediate plate and a manifold plate and means providing commutation porting comprising a movable commutator valve plate 43. The commutator 43 is radially surrounded by a plate 44 situated between a cover plate 46 and the manifold plate 42. Plate 41 is situated between the stator 22 and the rotor 23 at one of the adjacent ends thereof and the manifold plate 42. A clamping plate 47 is disposed at the opposite adjacent ends of the stator 22 and the rotor 23 and the entire assembly is maintained in fixed relation by means of a plurality of threaded clamping bolts 48 which extend through registered bores formed in the respective plates 41, 42, 44 and 47 and are threaded into the body 11 as indicated at reference numeral 49.

Plates 41, 42, 44, and 47 are circularly shaped in vertical cross section and have diameters equal to the diameter of the outer wall 24 of the stator 22, thereby providing an axially extending annular fluid flow passageway 50 along the inside wall 26 of the casing 12 between plates 47 and 44. Other flow passageways are provided in bores 51 and 52 formed in the wobble shaft 33 and in bores 53 and 54 formed in the drive sleeve 14.

In order to understand the operation of the valving arrangement 40 it is necessary to understand various relationships which exist between certain flow passageways formed in the stationary plates 41 and 42 and the commutator valve plate 43.

Referring to FIG. 5, the stationary plate 41 situated immediately adjacent the stator 22 has formed therein a plurality of radial flow passageways 56 extending axially therethrough. The passageways 56 correspond in number to the number of fluid chambers 30 formed between the lobes 29 of the stator 22 as well as to the number of clamping bolts 48 which extend axially therethrough in a corresponding number of circumferentially spaced bolt-receiving axial bores 57. Each of the passageways 56 openly communicates with its corresponding bore 57 and each of the bores 57 is oversized at a radially inner segment as indicated at reference numeral 58.

The plate 41 is also centrally apertured as at 59 to receive the wobble shaft 33, a forward or nose portion 60 of which is received in a central bore 61 formed in the commutator valve plate 43.

As further illustrated in FIG. 5, the passageways 56 formed in the plate 41 extend radially inwardly of the inner wall 27 of the stator 22 such that the pockets or fluid chambers 30 formed between the lobe 29 of the stator 22 are in open fluid communication therewith.

Referring to FIG. 3, the manifold plate 42 also has a series of circumferentially spaced axial bores formed therein to receive the shanks of the clamping bolts 48, such bores being indicated, for example, at reference numeral 60. A plurality of dog-legged grooves 64 are formed in a radial face 66 and extend in a curved but radially inwardly sloping direction from a corresponding bore 60 to a distal end 67 which communicates with an axial passage 67a of limited cross-sectional area to an opposite face 68 of the plate 42. As illustrated, the passages 67a are disposed in a circular pattern around a concentric bore 69 extending axially through the plate 42 to receive the wobble shaft 33. It is further noted that a radial inner portion 70 of each of the bores 60 is enlarged to provide an axial flow path surrounding a portion of the circumference of the clamping bolts 48, such flow passageway being indicated at reference numeral 71 in FIG. 1.

Referring to FIGS. 1 and 4, the commutator valve 43 is formed in the shape of a disc and includes a cylindrical peripheral wall 72 having a diameter substantially less than the diameter of an inner wall 73 of the plate 44 in which it resides. One radial face 74 of the commutator valve plate 43 slidingly engages an inner radial wall 76 of the cover plate 46 whereas an opposite radial face 77 slidingly engages a radial face 78 of the manifold plate 42.

As illustrated, a concentrically disposed recess 79 is formed in the commutator face 74 in surrounding relation to the bore 61, and another concentric recess 80 is formed in face 77. The recess 79 provides a fluid chamber in communication with the axial bore 51 formed in the wobble shaft 33 since a forward wall 81 of the wobble shaft is angularly disposed with respect to the inner wall 76 of the cover plate 46. Recess 80 is also in communication with the bore 51 of the wobble shaft 33 through radial passages 82 extending through the shaft 33.

As previously mentioned, whether the hydraulic device 10 is operating as a pump or as a motor, the valving arrangement 40 which includes the commutator valve plate 43 plays a vital role in directing the fluid into and out of the volumetrically varying fluid chambers 30 in precisely timed relation to the hypocycloidal movement of the rotor 23 with respect to the stator 22. As will be more fully appreciated hereinafter, the commutator valve plate 43 of the device 10 performs its valving function as it is driven by the wobble shaft 33 through an orbital path corresponding to the orbital path of movement of the rotor 23.

OPERATION

In order to more fully understand the present invention the operation of the hydraulic device 10 is described hereinafter in detail. Since the device is adapted to function either as a pump or as a motor, however, it is not necessary to describe the operation thereof in its performance of both functions since in operating as a pump, the interaction of the various parts is opposite that which obtains when the device functions as a motor.

In the ensuring description it will be assumed that the hydraulic device 10 is functioning as a hydraulic motor to rotate the work input-output shaft 18. A source of pressurized fluid such as a pump indicated at reference numeral 85 is connected to an opening 83 formed in the body 11 from which it passes to a passageway 84 and into the flow passageway 50 situated immediately interiorly of the wall 26 of the casing 12. The pressurized fluid then flows through radially overlapping angularly spaced grooves 85 and 86 formed respectively in the faces 68 and 77 of the plates 42 and 44 and into a chamber 87 surrounding the commutator valve plate 43.

Regardless of the position of the commutator valve plate 43, at least one of the flow passageways 67 formed in the manifold plate 42 communicates with the chamber 87 and directs the pressurized fluid through its respective dog-legged passageway 64 to the flow passageway 71 communicating therewith. The pressurized fluid is then communicated into the flow passageway 65 formed in the plate 41 which is in register with the pressurized passageway 71 and thence into a fluid chamber or pocket 30 formed between the lobes 29 of the stator 22. Pressurization of one or more of the fluid chambers 30 in any position of the rotor 23 imparts a rotating force to the rotor in one direction of rotation, such direction being counterclockwise in FIG. 2 when the opening 83 is connected to a source of pressurized fluid and the device 10 is functioning as a hydraulic motor.

Each of the fluid chambers 30 in communication with the pressurized fluid expands in size because of the simultaneous orbital and rotational movement of the rotor 23 whereas the chambers 30 which are not in communication with the pressurized fluid contract as the lobes 31 of the rotor 23 begin to move into the chambers 30 and discharge fluid therefrom.

The fluid in the chambers 30 which are being reduced in size is directed through corresponding ones of the radial passages 56 of the intermediate plate 41 and thence through passageways 65 and 71 to the corresponding dog-legged passageways 64. The fluid then flows through the associated passageways 67 formed at the distal ends of the corresponding passages 64 and thence through the recess 80 formed in the commutator plate 43, through bores 82, 51 and 52 formed in the wobble shaft 33, thence through passages 53 and 54 formed in the drive sleeve 14 and out of the body 11 through the chamber 13, passageway 85 communicating therewith and with an opening 88 which is disposed adjacent the opening 83.

As the rotor 23 rotates through an orbital path of travel as a result of the successive pressurization of circumferentially adjacent fluid chambers 30, the wobble shaft 33 is also rotated. In the embodiment illustrated the stator 22 has seven lobes whereas the rotor 23 has six, and thus for each revolution thereof the rotor 23 will orbit six times. The wobble shaft 33 also orbits at point 38 about the pivotal end or point 36 at the orbiting speed of the rotor 23.

Since the commutator plate 43 is coupled to the nose 60 of the wobble shaft 33 it also will be orbited at the orbit speed of the rotor 23. By referring to the drawings it will be noted that the commutator valve 43 alternately and sequentially opens and closes the radially angularly adjacent passageways 67 to and from the fluid pressurized chamber 87 as it orbits in timed relation to the orbital movement of the rotor 23, whereby the fluid pockets or chambers 30 sequentially and alternately expand under the driving force of the pressurized fluid and then contract to discharge the fluid therefrom.

The wobble shaft 33 is coupled to the work input-output shaft 18 and thus rotates shaft 18 at the speed of rotation of the rotor 23. Operation of the device 10 and rotation of the shaft 18 will continue as long as the fluid opening 83 is connected to the discharge side of the pump 85.

In order to reverse the direction of rotation of the shaft 18 it is only necessary to connect opening 88 to the source of pressurized fluid rather than opening 83. The pressurized fluid will then flow through the stator and rotor 22 and 23 in a direction opposite to that described above, thereby causing the rotor 23 to rotate in a clockwise direction as viewed in FIG. 2. When the device 10 is utilized as a hydraulic pump the shaft 18 is connected for rotation to any suitable driving motor and fluid will be pumped through the device 10 between the openings 83 and 88 in a direction which corresponds to the direction of rotation of the shaft 18.

In accordance with the principles of the present invention a flexible disc-shaped plate or braking element 89 is interposed between the stationary clamping plate 47 and the stator 22 and the rotor 23 of the gerotor gear set. The braking plate 89 is apertured as at 90 to receive of the clamping bolts 48 and it will therefore be appreciated that as the bolts 48 are drawn up, the peripheral portion of the braking plate 89 which is sandwiched between the stator 22 and the stationary clamping plate 47 is maintained in stationary or fixed assembly therewith.

Formed in a radial wall 91 of the clamping plate 47 is an angular fluid pressure chamber 92 which opens to an adjacent wall 93 of the braking plate 89. Pressure chamber 92 is preferably circumferentially continuous and is arranged concentrically with respect to the stator 22 but is disposed radially inwardly thereof, that is, inwardly of the innermost extremities of the vanes 28.

A fluid connection 94 is formed in the body 11 opposite the fluid connections 83 and 88 and communicates with the pressure chamber 92 by means of a passageway 96 formed in the body 11 and another passage 97 formed in the stationary clamping plate 47. The fluid inlet 94 is adapted for connection to a source of pressurized fluid and as the fluid pressure in chamber 92 is increased, an axial force is applied to that portion of the braking plate 89 which is in direct engagement with the rotor 23. The frictional force imposed by the braking plate 89 on the rotor 23 produces a braking effect which may, of course, actually arrest improvement of the rotor depending upon the level of the pressure in chamber 92, the coefficients of friction of the braking plate 89 and the rotor 23, the lubrication effect of the fluid being transmitted through the device 10 as well as other variables which will be understood by those skilled in the art.

While any convenient source of pressurized fluid may be used for pressurization of the chamber 92, in many applications it will be desirable to use a manually actuated fluid pressure generator and in the embodiment illustrated in FIG. 1 the source comprises a hydraulic cylinder 98 connected to the inlet 94 by means of a fluid line 99 and having a piston rod 101 actuated by means of a foot pedal indicated schematically at reference numeral 101.

For example, assuming that the device 10 is being utilized as a hydraulic motor in the operation of a vehicular-mounted winch, the main power fluid pump 85 can be driven by the conventional internal combustion engine of the vehicle and the flow of fluid to and from the device 10 controlled by means of a spool valve or the like as indicated at 102. The actual speed of operation of the device 10, and thus the speed of movement of the winch, can be controlled very carefully by means of the braking mechanism of the present invention as actuated by the foot pedal 101. Furthermore, the winch load can be maintained in place, even during periods of inoperation of the main power fluid pump 85 and even should the main hydraulic circuitry become ruptured, causing an immediate reduction in pressure in fluid lines 103 and 104.

In devices such as garden tractors wherein a pair of hydraulic devices 10 may be utilized as hydraulic motors and combined with a variable displacement fluid pump to independently drive a pair of driving wheels, the utilization of the braking or clutching system of the present invention enables the operator to steer the tractor merely by actuation of a pair of foot pedals connected respectively to the hydraulic motors. In FIG. 6, another embodiment of the invention is disclosed which includes a hydraulic device indicated at reference character 10b which is similar to the device 10 shown in FIGS. 1-5 except for the location of the braking or clutching element. Thus, in the embodiment of FIG. 6, which may find particular utility in serving as a hydraulic motor in driving the power-driven wheels of a vehicle, the work output shaft 21b is journaled in a hub indicated generally at reference numeral 105 by means of a bearing assembly indicated at 107. The shaft 21b therefore rotates relative to the body 11b and casing 12b as well as to the hub 106.

The hub 105 comprises a pair of hubparts indicated respectively at 106 and 111. The shaft 21b is keyed at 108 to a faceplate 109 for joint rotation therewith, faceplate 109 being journaled for rotation in a bore 110 of hub part 111 by means of a bearing 112. The hub parts 106 and 111 are connected in a fixed assembly by means of a plurality of threaded bolts or the like as indicated at reference numerals 113. When the device 10b is being utilized in vehicular driving applications a power-driven wheel is mounted directly on the hub 105 by means of the bolts 113, for example, for joint rotation with the hub 105.

The hub part 106 comprises a radial wall 114 which is disposed adjacent a complementary radial wall 116 of the hub part 109. Interposed between the radial walls 114 and 116 is a disc-shaped flexible braking or clutching element 89b which is similar to element 89 of the embodiment shown in FIG. 1. The peripheral portion of the element 89b is connected in fixed assembly to the marginal portion of the hub part 109 by means of a plurality of threaded fasteners such as the bolts and nuts indicated at reference numerals 117 and 118.

Formed in radial wall 116 is a pressure chamber 92b which corresponds to chamber 92 of the embodiment shown in FIG. 1 and which is also preferably circumferentially continuous about an axis coinciding with the axis of rotation of the shaft 21b. The chamber 92b is connected to a source of pressurized fluid, such as a foot-pedal-operated hydraulic cylinder similar to that illustrated at reference numeral 98 in FIG. 1, by means of a passageway 96b which comprises a first leg 119 extending axially in the shaft 21b and closed at one end by means of a threaded plug 115, a plurality of angularly spaced radial legs 120, an annular groove 121 formed in the faceplate 109 and a sloping passage 122 also formed in the faceplate 109.

At an opposite end of the axial leg 119 is a plurality of radial legs 120b communicating with an annular groove 121b formed in the housing 11b. The groove 121b communicates via passage 125 with a fluid part 94b corresponding to part 94 of the embodiment shown in FIG. 1.

The shaft 21b, faceplate 109 and the braking or clutching element 89b are therefore interconnected for joint rotation, whereas the housing 11b is adapted to be stationarily mounted on the frame of the vehicle. For that purpose a mounting collar 123 has a plurality of angularly spaced bores 124 extending therethrough for receiving suitable mounting bolts.

Assuming that the device 10b is connected in constant communication with a main power fluid pump, the chamber 92b may be pressurized and depressurized to selectively drive the wheel which is mounted on the hub 105. When used in tandem, proper actuation of the clutching elements 89b of a pair of hydraulic motors 10b can even serve to steer the vehicle by selectively varying the driving speed of the two motors.

Although minor modifications might be suggested by those versed in the art, it should be understood that I wish to embody within the scope of the patent warranted hereon all such modifications as reasonably come within the scope of my contribution to the art.

I claim as my invention:

1. A hydraulic motor-pump assembly comprising
   an axial housing and means including a wall member forming a chamber within said housing,
   a fluid inlet and a fluid outlet formed in said housing for directing fluid to and from said chamber,
   a gerotor gear set in said chamber including an internally toothed stator and an externally toothed rotor within said stator and having one tooth less than said stator for relative orbital and rotational movement between said stator and said rotor to provide expanding and contracting fluid pockets between the teeth thereof,
   a work input-output shaft mounted for rotation on said housing in axial alignment therewith,
   means for connecting said work input-output shaft and said gerotor gear set for joint rotation relative to the rotational component of movement of said gerotor gear set,
   a friction brake member disposed between said gerotor gear set and said housing wall member and connected in fixed assembly to said housing,
   at least a portion of said brake member being movable into engagement with said gear set,
   means forming a pressure chamber in said housing wall member opening to said brake member and,
   means for directing pressurized fluid to said chamber for urging said brake member into tight frictional braking engagement with said gear set.

2. The invention as defined in claim 1 wherein said brake member comprises a flexible disc-shaped plate said portion of which is normally disposed in sliding engagement with said gear set and is movable by virtue of the pressurization of said pressure chamber into tight frictional braking engagement with said gear set.

3. The invention as defined in claim 1 and including first pump and valve means for connection to said fluid inlet and fluid outlet and second independently operable pump and valve means for controlling the pressurization of said pressure chamber.

4. A hydraulic motor-pump assembly comprising a housing including stationary wall means, work input-output means including a pair of relatively rotatable gears at least one of which is supported in said housing for rotatable movement relative thereto and a shaft mounted on said housing and connected to said one gear for joint rotation therewith, first hydraulic circuit means for directing fluid to and from said gear means, and hydraulically operated brake or locking means for restraining said one gear against rotation relative to said housing comprising a flexible disc-shaped pressure-operated friction plate disposed between and frictionally engageable with said stationary wall means and said one gear, means forming a pressure chamber in said stationary wall means communicating with said friction plate, and means for pressurizing said chamber to urge said friction plate into tight frictional braking engagement with said stationary wall means and said one gear including second hydraulic circuit means operable selectively and completely independently of said first hydraulic circuit means.

* * * * *